United States Patent [19]

Tuda

[11] Patent Number: 4,534,694
[45] Date of Patent: Aug. 13, 1985

[54] MULTI-ARTICULATE ARM MECHANISM

[75] Inventor: Goro Tuda, Kobe, Japan

[73] Assignee: Kabushiki Kaisha Kobe Seiko Sho, Kobe, Japan

[21] Appl. No.: 458,706

[22] Filed: Jan. 17, 1983

[30] Foreign Application Priority Data

Jan. 18, 1982 [JP] Japan .................................. 57-6485

[51] Int. Cl.³ ............................................ B66C 23/00
[52] U.S. Cl. ....................................... 414/735; 901/6; 901/15; 901/19
[58] Field of Search ............ 414/719, 735, 917, 744 R, 414/744 A; 901/6, 8, 15, 19, 22, 23, 24, 48; 212/189, 195

[56] References Cited

U.S. PATENT DOCUMENTS

| | | | |
|---|---|---|---|
| 2,831,589 | 4/1958 | Way ........................................ | 414/735 |
| 4,073,201 | 2/1978 | Taylor et al. ...................... | 901/29 X |
| 4,177,002 | 12/1979 | Motoda et al. ................... | 901/15 X |
| 4,260,319 | 4/1981 | Motoda et al. ................... | 414/917 X |
| 4,407,625 | 10/1983 | Shum ................................. | 414/735 X |

OTHER PUBLICATIONS

"Specialisation is the Watchword on Tokyo Robot Show Stands", The Engineer, Nov. 3, 1977.

Primary Examiner—Robert J. Spar
Assistant Examiner—Donald W. Underwood
Attorney, Agent, or Firm—Oblon, Fisher, Spivak, McClelland & Maier

[57] ABSTRACT

A multi-articulated arm mechanism including a first shaft rotatably mounted on a first base plate; a first arm mounted pivotally only in a plane extending through and parallel with the first shaft; a first positioning mechanism for determining the angle of the first arm with the first shaft; a second arm attached to the first arm and pivotable only in the first plane; a second positioning mechanism for determining the angle of the second arm with the first arm; a slide arm connecting a third fulcrum point on a second base plate located remote from the first plane to a second fixed fulcrum point on the second arm; and a third positioning mechanism for determining the length of the slide arm.

7 Claims, 8 Drawing Figures

MULTI-ARTICULATE ARM MECHANISM

BACKGROUND OF THE INVENTION

1. Field of the Invention

This invention relates to a multi-articulated arm mechanism suitable for use in working robots and manipulators, and more particularly to an arm mechanism which has high rigidity against operational reaction forces or other loads which are imposed on the arm during operation.

2. Description of the Prior Art

In general, a multi-joint robot has a series of arms with articulated joints on a fixed base or pedestal, performing an assigned job by a working tool which is attached to the distal end of the arms. Therefore, the force applied to a work is invariably reflected by a bending moment acting on the base portion of the arms, causing operational errors by arm flexure which occurs to a greater degree with longer arms. For this reason, the application of the multi-articulated robots has been limited to those fields in which the robots can perform a required job without contacting the work, free of the reaction forces as in welding and coating operations. They have been considered unsuitable for operations like grinding or other machining operations which involve reaction forces or operations which require attaching a testing device or other devices of a large weight at the distal end of the arm.

Nevertheless, the multi-articulated arm mechanism is superior in operability to the arm mechanisms of the perpendicular coordinates system or the parallel type arm mechanisms, and accordingly extremely convenient for performing complicated operations, for example, the operations which have to be carried out in a narrow limited space or the operations which require evasion of obstacles.

SUMMARY OF THE INVENTION

It is therefore an object of the present invention to provide an improved multi-articulated arm mechanism with a slide arm as will be described in greater detail hereinafter, absorbing the operational reaction forces as an axial stress by the component parts of the arm mechanism to thereby reduce the arm flexure due to the bending moment to a minimum to improve the accuracy of positioning and machining operations.

According to the present invention, there is provided a multi-articulated arm mechanism which comprises a first shaft rotatably mounted on a first base plate; a first arm pivotally mounted only in a first plane extending through and parallel with the first shaft; first positioning means for determining the angle of the first arm with the first shaft; a second arm attached to the first arm and pivotable only in the first plane; second positioning means for determining the angle of the second arm with the first arm; a slide arm connecting a third fulcrum point on a second base plate located remote from the first plane to a second fixed fulcrum point on the second arm; and third positioning means for determining the length of the slide arm.

The above and other objects, features and advantages of the present invention will become apparent from the following description and the appended claims, taken in conjunction with the accompanying drawings which show by way of example preferred embodiments of the invention.

DETAILED DESCRIPTION OF THE PREFERRED EMBODIMENTS

Figure 1:
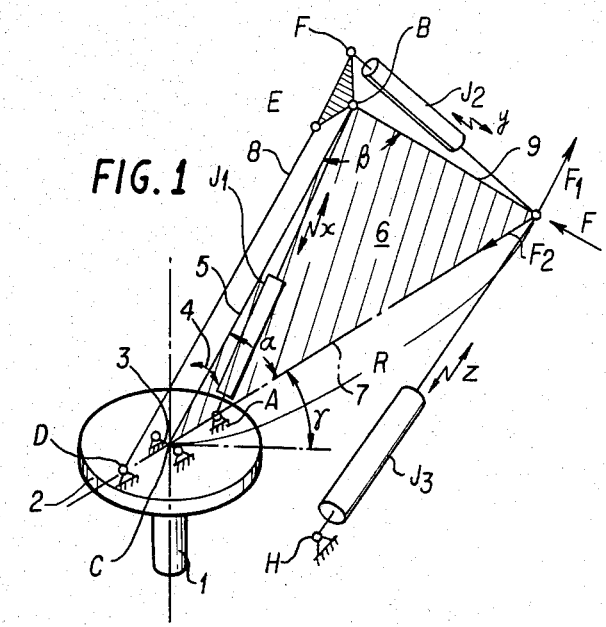
FIG. 1 is a diagrammatic skeletal view of an arm mechanism, employed for the explanation of the principles according to the present invention.
Figure 2:
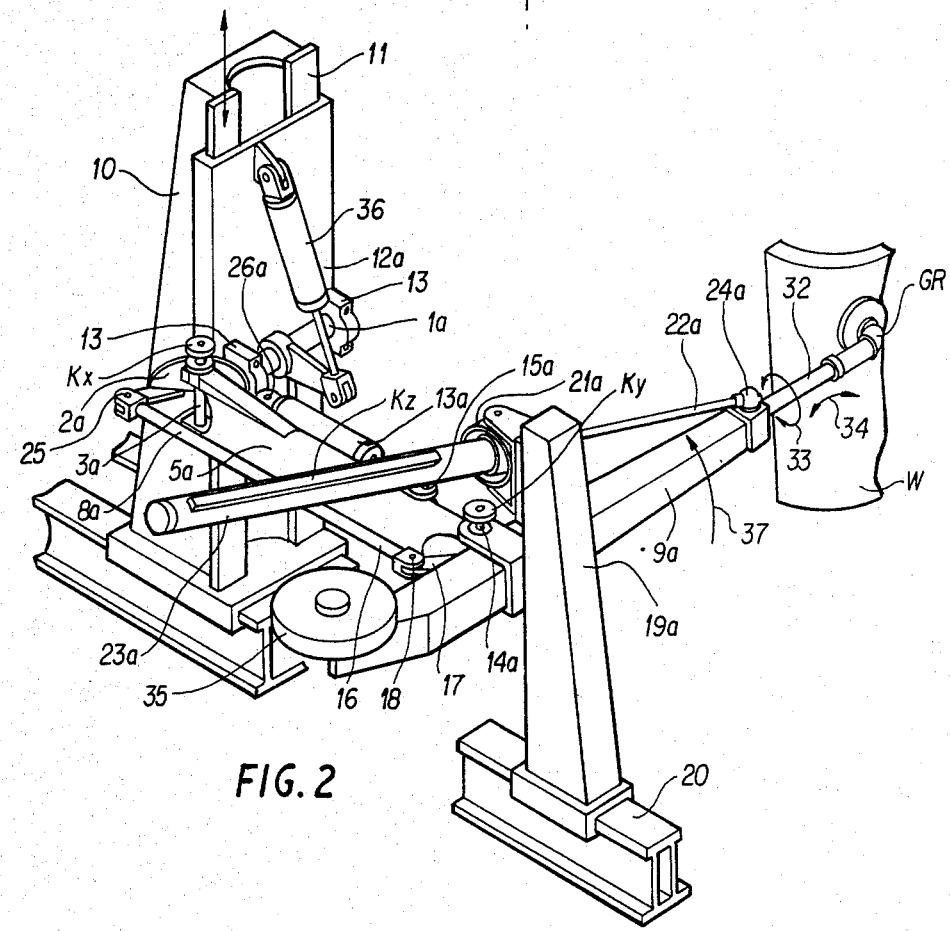
FIG. 2 is a perspective view of a horizontal type arm mechanism incorporating the present invention.
Figure 3:
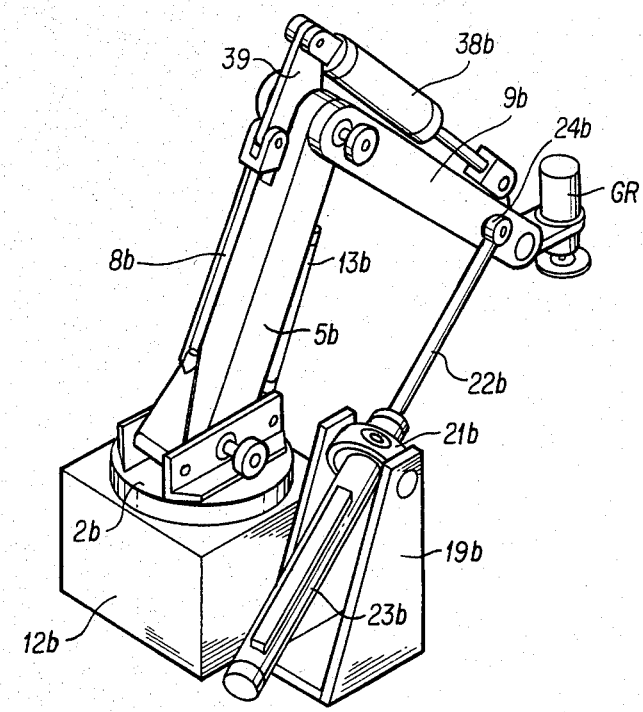
FIG. 3 is a perspective view of a vertical type arm mechanism incorporating the present invention.

Hereinafter, the invention is described more particularly with reference to the accompanying drawings which show the present invention as applied to the arm of a robot which is adopted to perform a grinding operation for large rotary blades, runners, water wheels or the like. Reference is now had to FIGS. 1 to 3, of which FIG. 1 is a skeletal illustration of an arm mechanism explaining the principles of the present invention, FIG. 2 is a perspective view of a horizontal type arm mechanism constituting a first embodiment of the invention, and FIG. 3 is a perspective view of a vertical type arm mechanism constituting a second embodiment of the instant invention.

Referring first to FIG. 1, there is shown at reference number 1 a first shaft which is rotatably supported on a first base plate (not shown) and which has a rotary plate 2 integrally mounted on the upper end thereof. A first arm 5 is pivotable in the direction of arrow 4 about the axis of a support shaft 3 which is fixedly mounted on the rotary plate 2, only in a plane 6 which extends through and parallel with the first shaft. A fourth fulcrum point B at the upper end of the first arm 5 is linked to a first fixed fulcrum point A on the rotary plate 2 by a first positioning means $J_1$, such that the first fulcrum point A, the fourth fulcrum point B and the intersecting point C of the support shaft 3 and the first arm 5 form the apexes of a triangle. Since $\overline{AC}$ and $\overline{BC}$ are constant, the angle $\alpha$ of the first arm 5 with a horizontal line 7 is determined by the distance between the fulcrum points A and B.

A fulcrum point D which is located on the other side 4 pivotal point C opposingly to the pivotal point A is connected through a parallel link 8 to a fulcrum point E of a triangular link BEF which is pivotally connected to the fourth fulcrum point B for pivoting movements only in the first plane 6. The length $\overline{DE}$ of the parallel link 8 is equal to the distance between the fulcrum points CB on the first arm 5, maintaining the same distance between the fulcrum points BE and the fulcrum points CD, namely, $\overline{BE} = \overline{CD}$. Consequently, the quadrilateral CDEF is a parallelpiped, so that the positions of the fulcrum points E and B are decided along with the position of the fixed point F by determination of the angle ACB and the first shaft 5.

On the other hand, connected to the fourth fulcrum point B is a second arm 9 which is pivotable only in the above-mentioned first plane 6. A second fulcrum point G which is fixed on the second arm 9 is connected to the fixed point F by a second positioning means $J_2$. Since the lengths $\overline{BE}$ and $\overline{BG}$ are constant, the dimensions of $\triangle BFG$ are determined by the length of FG which is determined by the second positioning means, and the position of the second fulcrum point G, namely, the angle $\beta$ between the first and second arms is determined by the positions of B and F.

As mentioned hereinbefore, the angle $\alpha$ is determined depending upon the distance $\overline{AB}$ which is determined by the operation of the first positioning means so that, if the first shaft 1 is fixed, the coordinates of B and F are also determined. Then, if the distance $\overline{FG}$ is determined by the operation of the second positioning means $J_2$, the coordinates of the second fulcrum point G are determined, simultaneously determining solely the distance R of GC. Accordingly, if the first shaft 1 is rotatable as mentioned hereinbefore, the movement of the second fulcrum point G follows an arcuate locus which maintains a constant distance $\overline{CG}$ from the intersecting point C. Therefore, if the point G were connected to a fixed point H which is not contained in the first plane 6 to determine the distance $\overline{GH}$ at a certain value, the coordinates of the second fulcrum point G alone are fixed even though the first shaft 1 is rotatable. In FIG. 1, the fixed point H is provided as a third fulcrum point H on a second base plate (not shown), connecting the third fulcrum point H with the second fulcrum point G by a third positioning means $J_3$ to thereby determine the distance $\overline{GH}$.

The positions of the first and second base plates are fixed in the above-described manner according to the present invention, suitably determining the distances $\overline{AB}$, $\overline{FG}$ and $\overline{GH}$ by the operations of the first to third positioning means $J_1$ to $J_3$, respectively, to determine the position of the second fulcrum point G.

Figure 4:
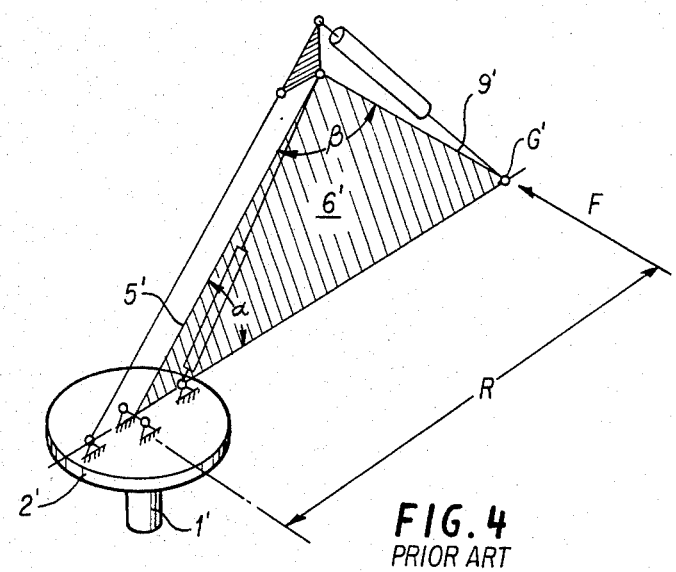
FIG. 4 is a diagrammatic skeletal view of a conventional multi-joint arm mechanism.

The arm mechanisms of the conventional multi-joint robots or manipulators are generally arranged to determine the position of the point G on its arcuate locus of movement solely by controlling the rotational angle of the first shaft, in the absence of the third positioning means as shown at $J_3$ of FIG. 1. For the purpose of comparison, such conventional arm mechanism is shown in FIG. 4, in which if a force F is imposed on the point G' in a direction perpendicular to the plane 6', a bending moment is imposed on the first shaft 1' in proportion to the distance R between the first shaft 5' and the point G', and at the same time a torsional stress and a bending stress resulting from the bending moment are imposed on the first arm 5' in proportion to the length of the second arm 9', in addition to a bending stress which is applied on the second arm 9' by the force F. Consequently, the point G' of the second arm 9' which carries a grinder is deviated to a great degree, considerably lowering the accuracy of the cutting surface.

In contrast, in the arm mechanism shown in FIG. 1, a force which is applied on the point G in a direction perpendicular to the first plane 6 is absorbed as an axial stress $F_1$ acting against the third positioning means $J_3$ and as a component force $F_2$ acting from the point G toward the point A without acting as a bending moment against the first shaft 1 since the first shaft 1 is rotatable. The component force $F_2$ is absorbed as an axial stress against the second arm 9, second positioning means $J_2$, triangular link BEF and parallel link 8, and also as an axial stress against the first arm 5 and first positioning means $J_1$. The flexure (displacement) which is caused by such compressive or tensile force of the axial stress is far smaller than the displacement which is caused by the bending and torsional moment, and this difference becomes greater with a longer arm. Thus, the displacement of the point G caused by the operational reaction force in the arm mechanism of FIG. 1 is markedly reduced as compared with the displacement of the point G' in the conventional multi-joint arm mechanism of FIG. 4.

The first to third positioning means in the foregoing description can be realized by the use of a hydraulic piston-cylinder or a ball screw type actuator. The telescopic displacement of the positioning means can be controlled to an appropriate degree, for example, by a magnescale or other displacement meter provided on the side wall of the cylinder in the case of a piston-cylinder and by measuring the rotation of the motor of the screw rod by an encoder in the case of a ball screw type actuator. Although in the foregoing description the joint G of the second arm and the third positioning means is shown as coinciding with the point subject to the operational reaction force for the convenience of explanation, it may of course be provided at a different position separate from the point to which the operational reaction force acts. Similarly, although the first and second arms have been shown as being connected to the first positioning means at the same point B, they may be connected to the latter separately at different points if desired.

FIG. 3 illustrates a grinding robot incorporating the principles of the arm mechanism of FIG. 1, namely, a vertical type grinding robot which has the first shaft in a vertical position in contrast to the horizontal type robot of FIG. 2 in which the arm mechanism of FIG. 1 is employed in a 90°-shifted state with the first shaft in a horizontal position.

In the mechanism shown in FIG. 2, the first shaft 1a is rotatably supported by bearings 13 on a first base plate 12a which is slidable up and down along slide surfaces 11 of an upright frame 10. Connected to a rotary plate 2a which is fixed to the rear end of the first shaft are one end of a first arm 5a, a parallel link 8a and a ball screw 13a of the first positioning means. The first arm 5a is connected to a second arm 9a through a support shaft 14a. The ball screw 13a is connected to the first arm 5a through a support shaft 15a. One end 16 of the parallel link 8a is connected through a pin 18 to one end of a triple joint link which is received in the second arm 9a. Although not shown, the second arm 9a accommodates therein a ball screw of the second positioning means, which is connected to the end of the triple joint link. Indicated at 19a is a second base plate which is slidable along the frame 20 and has a hydraulic cylinder 23a of the third positioning means attached to a gimbal joint 21a at the upper end thereof for retractably having the slide arm 22a protrude therefrom. The slide arm 22a is integrally connected with the piston rod of the hydraulic cylinder 23a, with its fore end interlocked with a middle portion of the second arm 9a through a spherical bearing 24a. Namely, upon comparing the mechanism of FIG. 2 with the skeletal illustration of FIG. 1, it will be seen that the pins 25 and 18 which support the end portions of the parallel link 8a correspond to the fulcrum points D and E, respectively, the pins 26a and 15a correspond to the first and fourth fulcrum points A and B, and the support shaft 14a also corresponds to the fourth fulcrum point B. On the other hand, the spherical bearing 24a and the gimbal joint 21a correspond to the second and third fulcrum points G and H, respectively.

Figure 5:
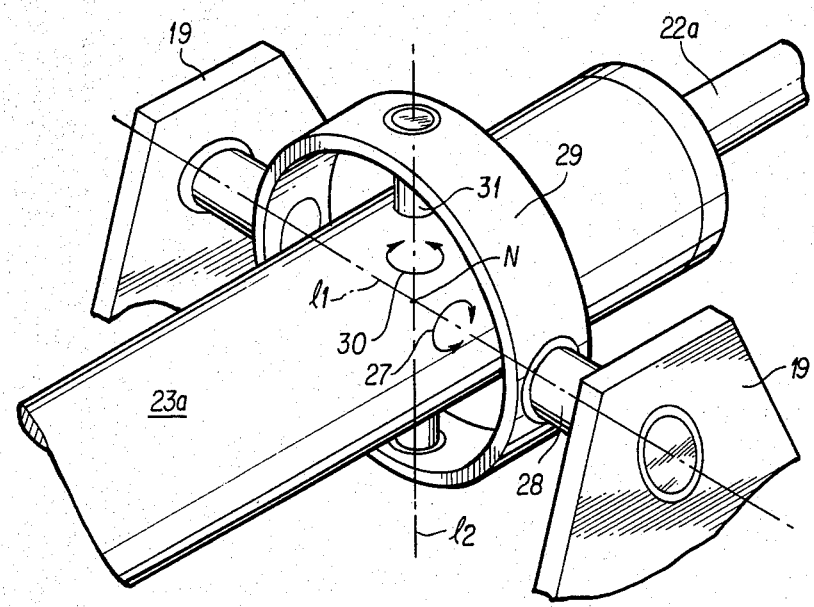
FIG. 5 is a perspective view of a gimbal joint useful in the embodiments of FIGS. 2 and 3.

The gimbal joint 21a supports the hydraulic cylinder 23a pivotally in any direction and includes, as shown particularly in FIG. 5, a ring 29 fixed to a shaft 28 which is rotatable in the direction of arrow 27 and a shaft 31 which fixedly supports thereon the hydraulic cylinder 23a, the shaft 31 being disposed perpendicularly to the shaft 28 and connected to the ring 29 pivotally in the direction of arrow 30. Consequently, the hydraulic cylinder 23a is freely rockable about the intersecting point N of the axes $l_1$ and $l_2$ of the shafts 28 and 31 in all directions. This mechanism has a high rigidity to endure large external forces, and is easy to determine the coordinates of the intersecting point N, facilitating the calculation of the coordinates of the grinder GR.

Although not shown particularly in FIG. 2, it is possible to arrange the shaft 32 of the second arm 9a which supports the grinder GR to be able to make a torsional movement through degrees in the direction of arrow 33 or to flex in the direction of arrow 34 to thereby facilitate the control of the posture of the grinder in conformity with the complicated shape of a work item W such as a runner or the like. Designated at 35 is a balance weight which prevents torsion of the first arm 5a, and at 36 a balancer which accommodates a coil spring or the like for counterbalancing the weights of the component parts ahead of the rotary plate 2a, including the first and second arms and the grinder.

FIG. 3 illustrates a mechanism of the vertical type which is shifted 90° as compared with the mechanism of FIG. 2 in the direction of arrow 37 of the same figure. The embodiment of FIG. 3 similarly includes a first base plate 12b, a second base plate 19b, a rotary plate 2b, first and second arms 5b and 9b, ball screws 13b and 38b serving as first and second positioning means, and a parallel link 8b connected to a triangular plate 39 which has the same function as the triple joint link. Indicated at 23b is a hydraulic piston-cylinder which is mounted on the second base plate 19b through a gimbal joint 21b, with a slide arm 22b connected to the second arm 9b through a spherical bearing 24b. A grinder GR is attached to the fore end of the second arm 9b. Denoted at Kx, Ky and Kz in FIGS. 2 and 3 are devices for detecting the angles $\alpha$ and $\beta$ and the extension of the slide arm, respectively.

The position of the grinder is controlled by the use of a computer according to the following procedures. In this instance, the grinder is supposed to be attached at a position a constant distance from the second fulcrum point G such that it suffices to control the position of the point G. This sort of positional control can be performed by a playback system or a numerical input system. In the case of the playback system, a grinder or a substitutional model is actually moved along a cutting line, while detecting the displacements of points caused by the movements of the model by means of the detectors Kx, Ky and Kz as indicated in the block diagram of FIG. 6, storing the detected displacements in memory means (RAM) through an interface circuit $IF_1$. Then, the content of the memory is reproduced to play back the movements of the grinder exactly along the memorized path. In the case of the numerical input system, the numerical data which determine the coordinates of the point G are fed to and stored in a computer from a pattern processing device or other input device, reproducing the movements of the grinder by the procedures similar to the playback system.

Figure 8:
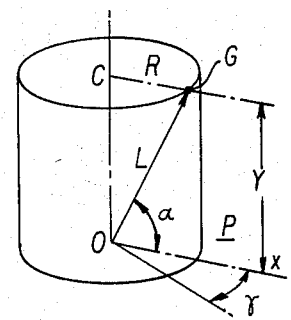
FIG. 8 is a diagram of the coordinate system.

In a cylindrical coordinates system, the position of the point G is expressed by the height Y from a reference surface P, the distance L from the rotational center O, and the rotational angle $\gamma$ from the reference line X as shown in FIG. 8. Supposing Y=0 (the reference surface is lifted to a level containing the point G) for the simplification of explanation, the distance L=R (the distance from the rotational center C to the point G) and thus expressed by G(R,$\gamma$).

Figure 6:
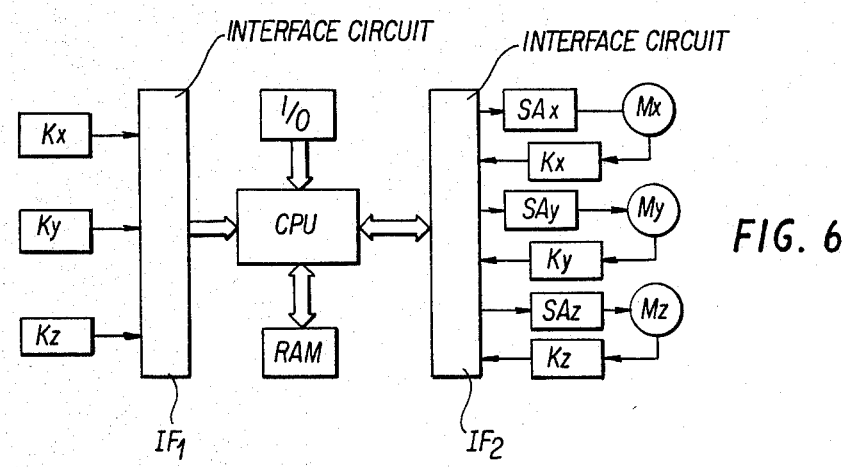
FIGS. 6 and 7 are a block diagram and a flow chart, respectively, for the arm position control in the present invention.
Figure 7:
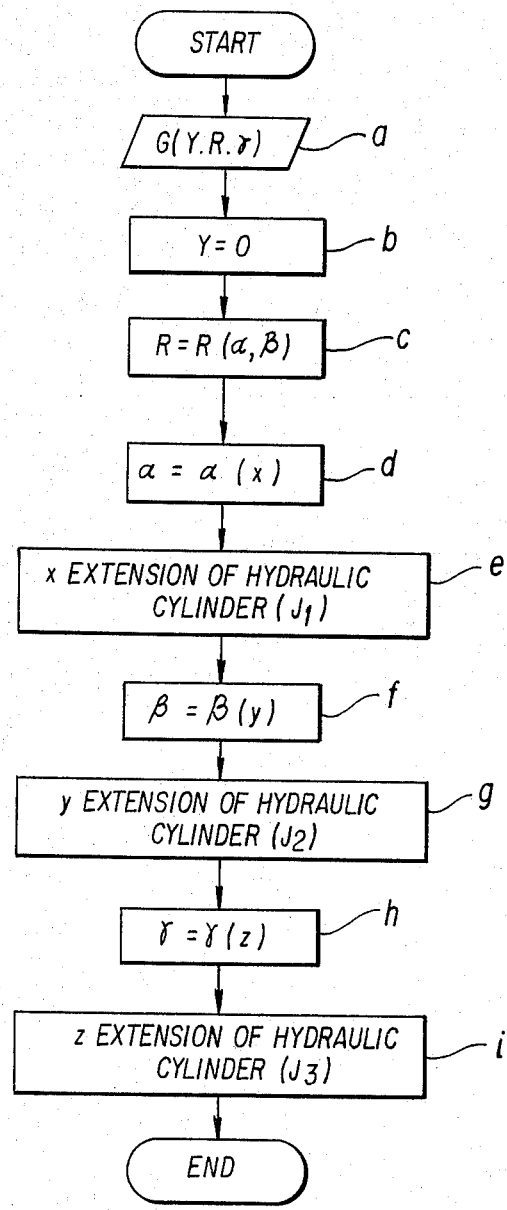

Reference is now had to FIGS. 6 and 7 which illustrate the steps of determining the position of the point G according to the principles of FIG. 1. In this instance, the intersecting point C is the origin, and the first shaft corresponds to the shaft $X_2$. The step (a) of FIG. 7 indicates that the coordinates of the point G are transferred and temporarily stored in the memory (RAM) through an input port (I/O). In step (b), a drive means (not shown) is actuated to lift the first base plate to coincide the reference surface F with the position of the origin C to make Y=0. Then, the value of the radius R is taken out from the RAM, and the angles $\alpha$ and $\beta$ are determined to decide the radius R. The distance R from the intersecting point C to the second fulcrum point G is determined simply by the angles $\alpha$ and $\beta$ (step (c)). Since the angles $\alpha$ and $\beta$ are determined simply by the amounts of extension of the ball screws $J_1$ and $J_2$, the values of x and y are calculated from the angles $\alpha$ and $\beta$ in steps (d) and (f). The signals indicative of the calculated values of x and y are fed to servo amplifiers SAx and SAy through the interface circuit $IF_2$, accordingly driving the servo motors Mx and My of the ball screws $J_1$ and $J_2$. The rotational angles of the servo motors Mx and My are measured by the encoders Kx and Ky and fed back to the CPU through the interface circuit $IF_2$, thereby automatically controlling the extensions of the ball screws $J_1$ and $J_2$ to conform respectively with the values x and y (steps (e) and (g)). In the next step (h), the value of $\gamma$ is read out from the RAM, calculating the extension z of the hydraulic cylinder $J_3$ to obtain the rotational angle $\gamma$. As clear from the foregoing description, the value z is determined solely by the value $\gamma$. Similarly to x and y, the extension z is automatically determined under the control of the servo amplifier SAz, servo motor Mz and the magnetic scale. By repeating the foregoing steps, the point G is moved sequentially through the specified or instructed positions to perform a predetermined grinding operation. In the grinding operation, there arises the necessity of further adding 3-freedom for the control of the posture of the grinder, but a detailed description in this regard is omitted since such can be attained in the manner similar to the above-described control of Y, R and $\gamma$.

It will be appreciated from the foregoing description that the multi-articulated arm mechanism according to the present invention is basically constituted by a first shaft rotatably mounted on a first base plate, a first arm pivotable only in a first plane passing through and parallel with the first shaft, first positioning means for determining the angle of the first arm with the first shaft, a second arm attached to the first arm pivotally only in the first plane, second positioning means for determining the angle of the second arm with respect to the first arm, a slide arm pivotally connecting a third fulcrum point on a second base plate located in a position remote from the first plane to a second fixed fulcrum point on the second arm, and third positioning means for determining the length of the slide arm. Therefore, the operational reaction forces are absorbed as axial stress of the slide arm and other component parts to prevent large displacement which would otherwise be caused by bending or torsional forces, permitting application of the arm mechanism to various operations which involve operational reaction forces as in the grinding operation, while retaining the high operability inherent to the multi-articulated arm mechanism.

Obviously, numerous modifications and variations of the present invention are possible in light of the above teachings. It is therefore to be understood that within the scope of the appended claims, the invention may be practiced otherwise than as specifically described herein.

What is claimed is:

1. A multi-articulated arm mechanism, comprising:
   a first base plate;
   a rotary member rotatably mounted to said first base plate so as to be rotatable with respect to said first base plate about a first axis of rotation;
   a first arm pivotally mounted at a first point thereof on said rotary member so as to be pivotable in a plane containing said first axis;
   first positioning means for selectively changing the angle formed between said first arm and said first axis;
   a second arm pivotally attached at a first point thereof to said first arm at a second point on said first arm remote from said first point of said first arm, said second arm being attached to said first arm so as to be pivotable in a plane common to both said first and second arms;
   second positioning means for selectively changing the angle formed between said second arm and said first arm,
   a second base plate located in a position outside said common plane; and
   third positioning means pivotally mounted at a first point thereof on said second base plate, said third positioning means further comprising a slide arm pivotally connected to said second arm at a second point of said second arm remote from said first point of said second arm, wherein said third positioning means further comprises means for selectively changing the distance between said second base plate and said second point of said second arm by extending said slide arm along a straight line running between said first point of said third positioning means and said second point of said second arm.

2. A multi-articulated arm mechanism as set forth in claim 1, wherein said first and second base plates each further comprise movable base plates.

3. A multi-articulated arm mechanism as set forth in claim 1, wherein said third positioning means is mounted on said second base plate by a gimbal joint.

4. A multi-articulated arm mechanism as set forth in claim 1, wherein said first positioning means is pivotally connected to said rotary member at a first point of said first positioning means and is further pivotally connected at a second point of said first positioning means to said first arm at a third point of said first arm, and wherein said first positioning means further comprises a hydraulic piston cylinder means for selectively changing the angle formed between said first arm and said first axis by selectively changing the distance between said first point of said first positioning means and said third point of said first arm.

5. A multi-articulated arm mechanism as set forth in claim 1, further comprising a triple joint link pivotally connected to said second arm at said first point of said second arm, and wherein said second positioning means further comprises a hydraulic piston cylinder pivotally connected to said triple joint link and pivotally connected to said second arm at a point of said second arm remote from said first point of said second arm, said second positioning means being cooperable with said first positioning means to move said second arm to a desired configuration in said common plane, said configuration being determined by the rotational angles of said first and second arms.

6. A multi-articulated arm mechanism as set forth in claim 1, wherein said first positioning means is pivotally connected to said rotary member at a first point of said first positioning means and is further pivotally connected at a second point of said first positioning means to said first arm at a third point of said first arm, and wherein said first positioning means further comprises a ball screw means for selectively changing the angle formed between said first arm and said first axis by selectively changing the distance between said first point of said first positioning means and said third point of said first arm.

7. A multi-articulated arm mechanism as set forth in claim 1, further comprising a triple joint link pivotally connected to said second arm at said first point of said second arm and wherein said second positioning means further comprises a ball screw pivotally connected to said triple joint link and pivotally connected to said second arm at a point of said second arm remote from said first point of said second arm, said second positioning means being cooperable with said first positioning means to move said second arm to a desired configuration in said common plane, said configuration being determined by the rotational angles of said first and second arms.

* * * * *